United States Patent [19]
Williams

[11] Patent Number: 5,010,809
[45] Date of Patent: Apr. 30, 1991

[54] FODDER CONDITIONING AND PACKING PROCESS

[76] Inventor: Kenneth J. Williams, 2 W. McCabe Rd., El Centro, Calif. 92243

[21] Appl. No.: 440,796

[22] Filed: Nov. 24, 1989

[51] Int. Cl.$^5$ ............................................. B30B 13/00
[52] U.S. Cl. ........................................ 100/35; 99/487; 100/38; 100/39; 100/71; 100/74; 100/75; 100/92; 100/95; 100/96; 100/99; 426/636
[58] Field of Search .................... 100/35, 38, 39, 71, 100/73-75, 92, 94, 95, 96, 99; 426/636; 99/487, 516

[56] References Cited

U.S. PATENT DOCUMENTS

| | | | |
|---|---|---|---|
| 1,688,524 | 10/1928 | Cobb | 100/73 X |
| 3,280,543 | 10/1966 | Lawrence et al. | 100/73 X |
| 3,352,229 | 11/1967 | Morse | 100/38 |
| 4,183,292 | 1/1980 | Banks | 99/487 X |
| 4,918,910 | 4/1990 | Sheehan et al. | 100/74 X |

FOREIGN PATENT DOCUMENTS

| | | | |
|---|---|---|---|
| 3232746 | 3/1984 | Fed. Rep. of Germany | 100/73 |
| 1368439 | 6/1964 | France | 100/75 |
| 61-4488 | 2/1986 | Japan | 426/636 |
| 62-158458 | 7/1987 | Japan | 426/636 |
| 2053652 | 2/1981 | United Kingdom | 426/636 |

Primary Examiner—Harvey C. Hornsby
Assistant Examiner—Stephen F. Gerrity
Attorney, Agent, or Firm—Henri J. A. Charmasson

[57] ABSTRACT

A process for conditioning and compacting vegetable fodder prior to storage and shipment which comprises breaking standard-sized bales and adjusting the moisture level of the fodder to reduce pulverization during subsequent compacting and handling; while at the same time injecting mold inhibitors and nutritional additive before repackaging the fodder into more compact bales for shipment.

3 Claims, 2 Drawing Sheets

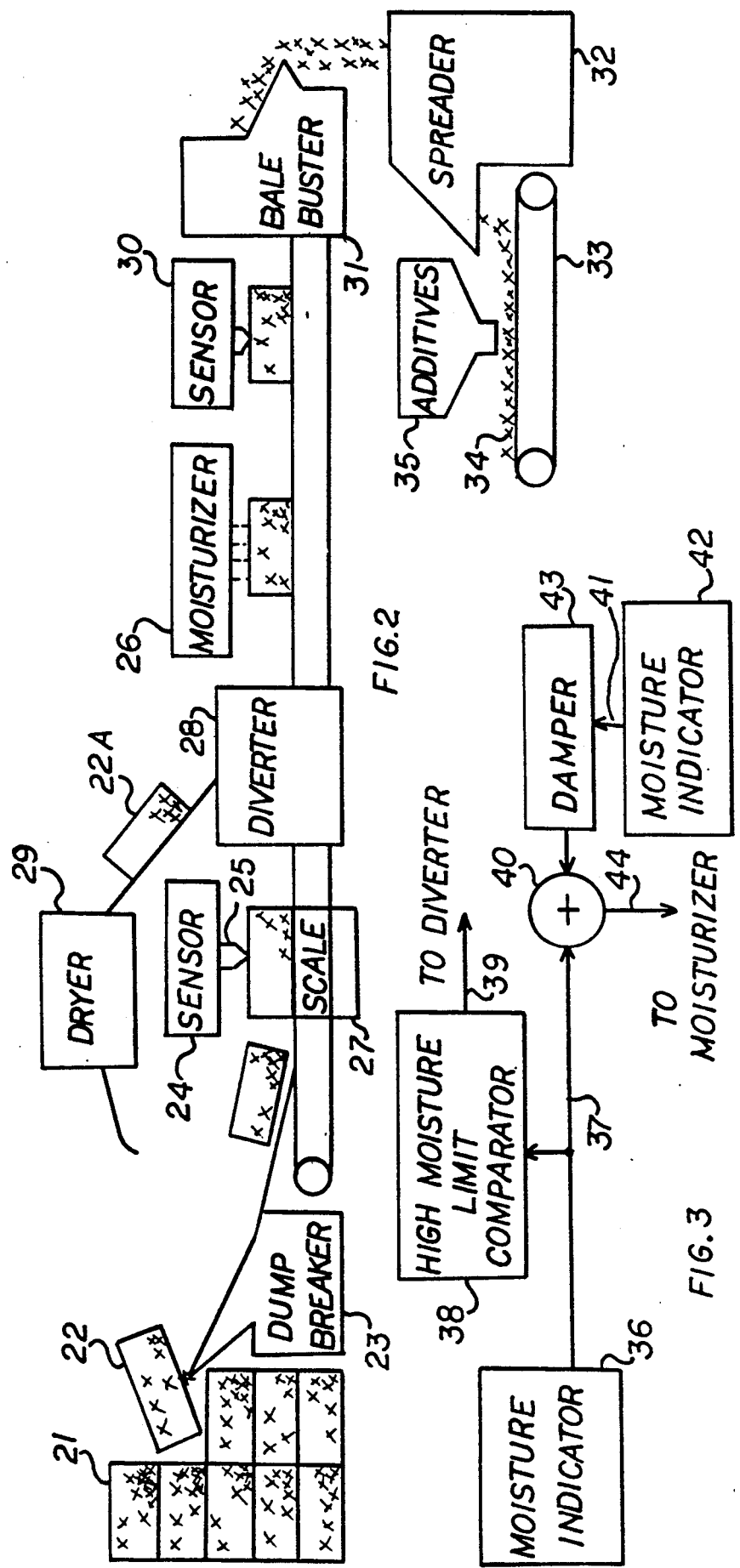

FODDER CONDITIONING AND PACKING PROCESS

BACKGROUND OF THE INVENTION

This invention relates to the packing, storage and shipping of fodder and more specifically hay.

Hay and other vegetable fodder is often packed and stored for long periods for use during the winter season, or may need to be shipped to remote locations. For instance, alfalfa and other types of hay grown in the United States is commonly packed and shipped overseas to countries with limited land resources such as Japan. Storage and shipping costs require that the hay be compacted into high density bales of convenient size and weight. Typically, a standard 220 kilogram (100 pounds) bale is compacted to reduce its length by half. The compacted bale can be broken down by the user into bite-size morsels that limit spillage and tramping when they are pulled through the manger. The storage or shipping of compacted fodder which retains an excessive level of moisture leads to the development of molds and harmful fermentation. On the other hand, compacting under great pressure of certain categories of hay in a dry state leads to a shattering of the leaf structures and general pulverization of the product. This pulverization results in great losses during transport and subsequent handling. It is practically impossible to control the moisture level of a stack of baled hay. This moisture level can vary greatly from bale to bale depending upon the weather conditions at the time the hay in each bale was harvested, the location of the bale within the haystack and its exposure to sun, wind, rain and other environmental hazards. Accordingly, when bales of hay are broken down and repackaged in bulk into compacted units for shipment, the condition and quality of the fodder upon arrival at a point of use is subject to unpredictable variations.

SUMMARY OF THE INVENTION

The principal and secondary objects of this invention is to provide a process for regulating and even improving the condition of forage fodder before it is packaged and stored or shipped for long periods, and to prevent pulverization of the fodder which may result from its compacting into more convenient and economical form than the conventional bales.

These and other objects are achieved by breaking up the standard sized bales of vegetable fodders which are produced by harvesting machines, and adjusting the moisture level to reduce pulverization during compacting and storage; while at the same time injecting mold retardant and other beneficial additives before repackaging the fodder into more compact bales for storage and shipping cost effectiveness and handling convenience.

BRIEF DESCRIPTION OF THE DRAWING

FIG. 2 is a diagram of an alternate embodiment of the claimed process; and

FIG. 3 is a block diagram of the moisturizer control system.

DESCRIPTION OF THE PREFERRED EMBODIMENTS OF THE INVENTION

Figure 1:
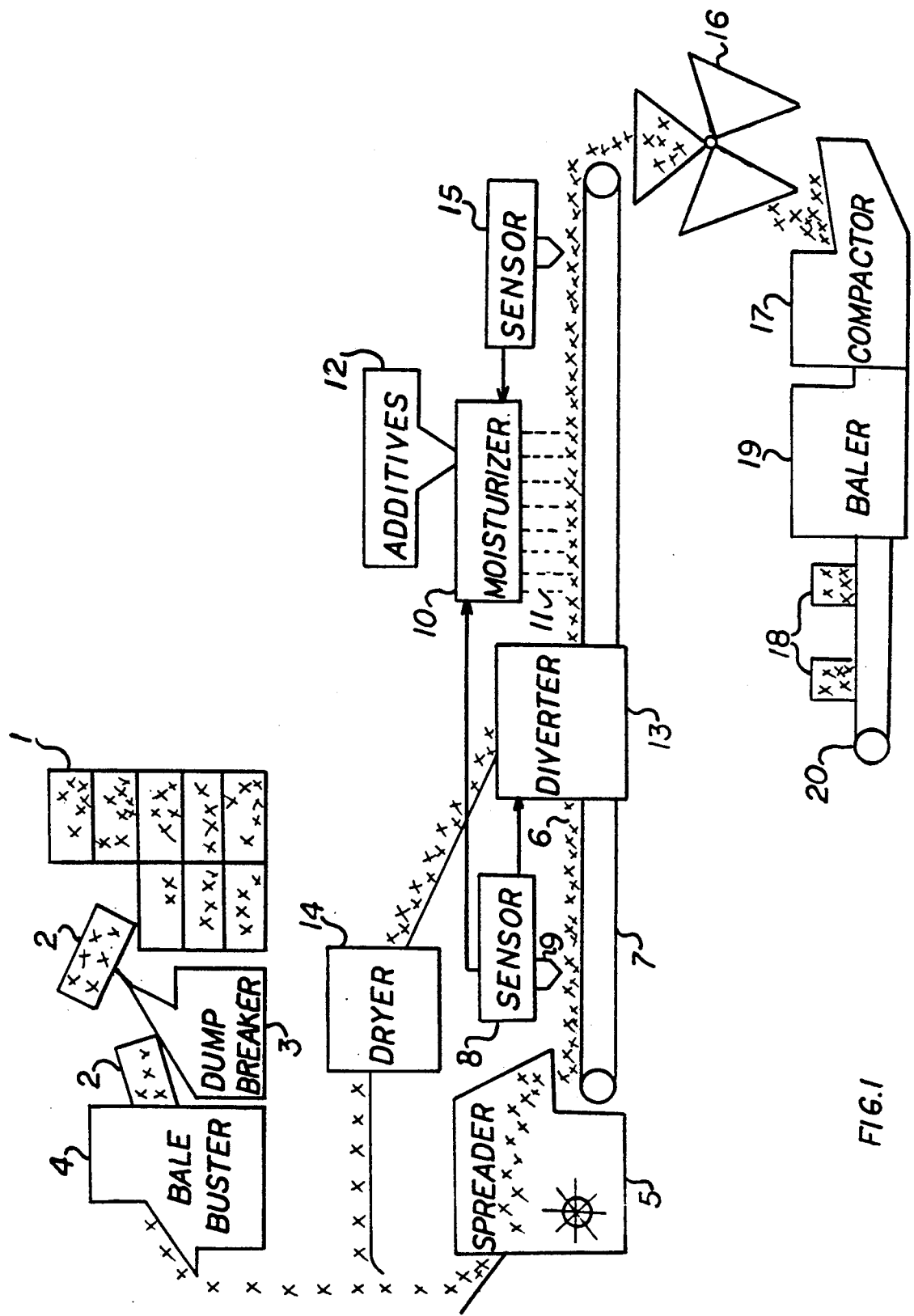
FIG. 1 is a diagram of a first process for the conditioning and packaging of fodder.

Referring now to the drawing, there is shown in FIG. 1 an illustrative diagram of the claimed process in which a typical dump 1 of bales of hay is broken up into individual bales 2 by a dump breaker 3. The bales are then broken up by a bale-buster 4. The loose hay is stirred by an agitator or spreader 5 which dumps it in a generally density-wise homogeneous mat 6 carried by a belt-conveyer 7. A moisture sensor 8 having a probe 9 in contact with the traveling mat 6 of hay monitors the moisture content. A moisturizer 10 adds a water solution to the mat as a function of the level of moisture measured by the sensor 8. This moisturizer 10 may be in the form of a steam injector or a liquid sprayer. The aqueous solution 11 which is injected into or sprayed over the mat of hay 6 may contain several additives. First, a mold retardant or inhibiting compounds such as sodium bicarbonate, urea, propranic acid, or any other edible preservative. The second additive may be an hormonal or other beneficial nutrient or a vitamin supplement. These additives may be premixed in a separate hopper 12 for mixing with the aqueous solution. A diverter 13 located between the moisture sensor 8 and the moisturizer 10 re-route any hay whose moisture level exceeds a given maximum limit toward a dryer 14 from which is then carried back toward the agitator 5. The diverter 13 may be implemented by means of a diverting barrier which falls across the conveyer belt as a function of the moisture sensor output. The dryer 14 is preferably of the cold vacuum-type, although any other drying process might be used. Thus, that part of the fodder which was found to an excessive level of moisture is run through the dryer as many times as it might be necessary to bring the level of moisture just below the desirable one as detected by the sensor 8. At which point it is allowed to proceed through the moisturizer 10 which will add the exact amount of moisture necessary as well as some other additives to meet the optimum predetermined level. A second moisture sensor 15 is used to monitor the final moisture level of the mat 6 as it exits the moisturizer station. The output of that sensor is fed back to the moisturizer to further refine its operation. The hay is then separated into batches of equal weight by a weight separator 16 which accumulates a predetermined weight of hay of the conveyer 7, then dumps each batch separately into the compactor 17. In the compactor 17, the batches of hay are pressed into a series of high density bales 18 which are secured by a banding machine 17.

It has been found that hay that retains a certain level of moisture will not be shattered by the compacting process, even in the case of the most fragile alfalfa-type with small leaves and sturdier stems. The compacted bales 18 are carried by a second conveyer 20 to a container or truck for shipment.

The alternate process illustrated in FIG. 2 begins as before with the breaking of a dump 21 into bales 22 by a dump breaker 23. However, the bales are not busted open, but processed whole through a first moisture sensor 24 having probes 25 before being subject to a moisturizer 26. Each bale is weighed by a scale 27, and its weight is used in determining the exact amount of moisture that must be injected or sprayed upon it by the moisturizer 26. Between those two units, bales 22A which are found to contain an excessive level of moisture are sent via a diverter 28 to a dryer 29 before being dumped back by the first moisture sensor 24. A second moisture sensor 30 monitors the moisture level of the bales as they come out of the moisturizer, and the output from the moisture sensor is used to further refine the operation of the moisturizer. The bales are then busted open by the bale buster 31 and their contents spread as an homogeneous mat 34 by the spreader 32 over another conveyer 33. The conveyer runs past an additive sprayer 35 before feeding a weight-separator. After that point the process follows the same sequence as in the first embodiment. The weight-separator loads a compactor which creates the final compacted bales which are banded by a banding unit 38, then carried by a conveyer 9 to a shipping container.

FIG. 3 illustrates the control system of the moisturizer's in either of the two processes. A first moisture indicator 36 which may be part of the sensor 8 of the first embodiment or the sensor 24 of the second embodiment yields a moisture level reading 37 which is fed into a high moisture limit comparator 38. When the high moisture level is exceeded the comparator issues a switching signal 34 to the diverter. The moisture signal 37 is also sent to a moisturizer control circuit 40 where it is combined with a second moisture level signal 41 issued by a second moisture indicator 42 which is part of the second sensor 15 of the first embodiment or the second sensor 30 of the second embodiment. The second moisture readout is electronically delayed by a damper circuit 43 so that it causes only a long term correction of the moisturizer activity. The combined signals 44 are then fed to the control input of the moisturizer.

The level of moisture which is desirable in hay that is going to be subjected to the compactor lies between 12 and 25 percent of weight. Given the control resolution which may be expected from the moisturizer, the high moisture limit above which the incoming hay will be diverted to a dryer may be set somewhere between 13% and 20%. The above moisture levels are particularly indicated for alfalfa. It should be understood that they may be adjusted according to the leafy quality of the hay and the compacting force of the compactor and the type and dosage of added preservative. In the preferred embodiments the compactor pressure is adjusted to create bales having generally twice the density of standard bales produced by current harvesting machinery.

While the preferred embodiments of the invention have been described, modifications can be made thereto and other embodiments may be devised without departing from the spirit of the invention and the scope of the appended claims.

What is claimed is:

1. A process for conditioning and compacting bales of fodder prior to storage and shipment which comprises the steps of:
   equalizing the moisture level of said fodder including measuring the moisture content of each of said bales;
   if said moisture content is below a first predetermined level, moisturizing said bale by a given amount of moisture;
   if said moisture level is above a second predetermined level, drying said bale;
   breaking said bales and spreading their contents into a generally density-wise homogeneous mat;
   injecting additives into said mat;
   conveying and breaking said mat into batches of generally equal weight; and
   compacting each of said batches into separate bundles.

2. The process of claim 1, wherein the step of equalizing further comprises:
   m. weighing each of said bales; and
   n. using the results of said weighing in determining the amount of moisture to apply to said bale.

3. The process of claim 1, wherein the step of drying said bale comprises:
   r. directing said bale to a dryer; and
   s. remeasuring the moisture content of the bale after drying.

* * * * *